May 21, 1957  J. WOJTOWICZ  2,792,715
ROLLER GEAR WHEELS
Filed April 16, 1956

INVENTOR.
John Wojtowicz
BY Louis Chayka
ATTORNEY.

United States Patent Office 2,792,715
Patented May 21, 1957

2,792,715

ROLLER GEAR WHEELS

John Wojtowicz, Detroit, Mich.

Application April 16, 1956, Serial No. 578,374

4 Claims. (Cl. 74—465)

My improvement pertains to a plurality of gear wheels in an arrangement in which one is the driving wheel and the other, or others, are the driven wheels, but in which arrangement all the wheels are adapted for rotation in the same plane.

Each of the wheels to which my improvement pertains is provided with a plurality of arcuate recesses in its peripheral portion, every second of the recesses holding a cylindrical roller capable of being rotated about its axis. When two such wheels are in engagement with each other, the rollers of one will fit into the arcuate recesses of the other. Thus, the rollers will form a medium for transmission of movement from the driving wheel to other wheel or wheels.

The object of my invention is to provide gear wheels in which the rollers will not only serve as a means of transmission of movement, but which also will serve as roller bearings for shafts on which the wheels are mounted.

Another object of the invention is to provide such gear wheels as a set in a holder or enclosure, in which the wheels are in mutually engaged positions, the enclosure containing circular races or tracks for the guidance of the rollers, disposed within said arcuate recesses.

A further object of my invention is to provide wheels of the type described herein, in which the individual rollers, when worn out, may be easily lifted out of the respective recesses and replaced by new ones.

I shall now describe my improvement with reference to the accompanying drawings in which.

Similar numerals refer to similar parts throughout the several views.

Figure 2:
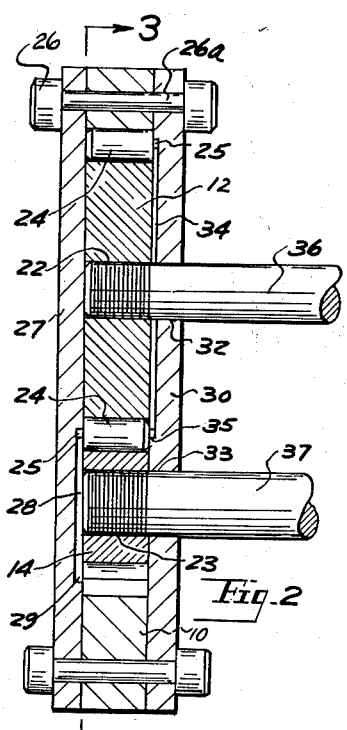
Fig. 2 is a sectional view on line 2—2 of Fig. 1.
Figure 1:
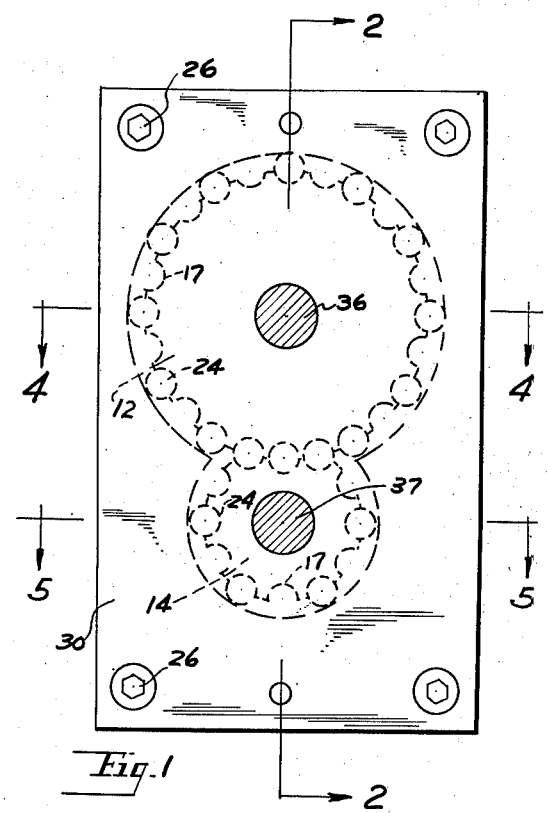
Fig. 1 is a top elevational view of a two wheel assembly in which the roller gear wheels, or roller wheels, are engaged with each other, the roller wheels and tracks for the guidance of the rollers being shown in dotted lines.
Figure 3:
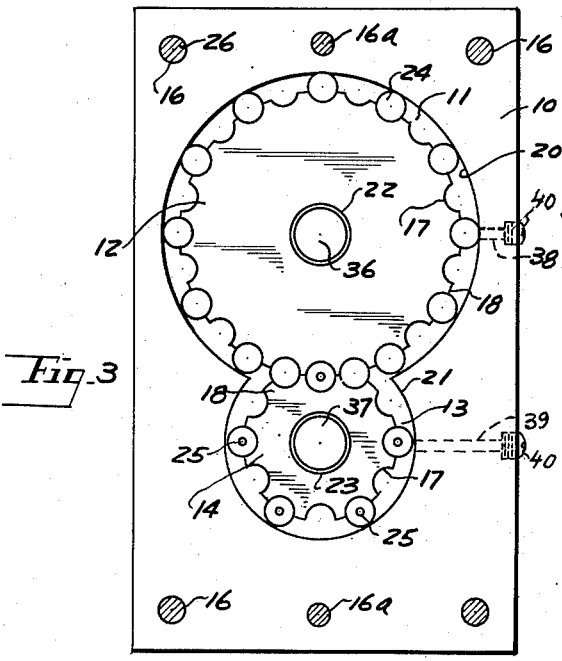
Fig. 3 is a sectional view on line 3—3 of Fig. 2.

The roller wheels mentioned above are located in a holder 10, which in the form shown in the drawings consists of a thick rectangular plate having therein a circular space 11 for reception of a wheel 12, which will be called the larger wheel, and a similar circular space 13 for reception of another wheel 14, which will be called the smaller wheel. It will be noted that the two circular spaces intersect each other as shown in dotted lines in Fig. 2. The holder 10 contains, in addition along the edge portions thereof, a plurality of circular holes 16 and 16a to which holes I will presently refer. Each of the wheels is provided with a plurality of arcuate recesses 17 in its peripheral portion, the recesses being separated from each other by radially extending sprocket-like teeth or tips 18.

Figure 4:
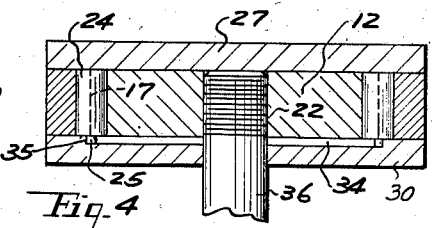
Fig. 4 is a sectional view on line 4—4 of Fig. 2.
Figure 5:
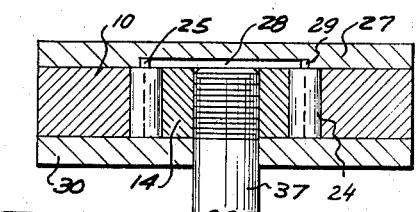
Fig. 5 is a sectional view on line 5—5 of Fig. 2.

The tips of the wheel 12 are spaced from the rim 20 of the larger circular space 11. Similarly the tips of the smaller wheel are spaced from the rim of smaller circular space 13, each of the wheels being provided with an axial aperture, which is marked 22 in the larger wheel and 23 in the smaller one. Every second recess of the larger wheel, and every second recess of the smaller one, contains a cylindrical roller 24, which includes at one end a stub axle 25. However, it will be noted that the stub axles of the rollers in one wheel extend in one direction, while the stub axles of the rollers in the other wheel extend in the opposite direction. This is best shown in Figs. 4 and 5. It will be also noted that the spacing between the deepest point of a recess 17 in a wheel and the rim of the circular space in which the wheel is held is such that a roller held in the recess will also bear against the rim of said circular space.

Secured to the holder from one side by bolts 26 is a rectangular cover 27 which, in its inner surface, contains a circular depression or recess 28. The latter is defined by a wall 29 which is disposed at right angle to said surface. The recess 28 is axially alined with the circular space 13 for the smaller wheel in the holder 10, and the diameter of the recess is such that the stub axles of the rollers held between the sprockets of the wheel will bear against said wall.

Disposed at the opposite side of the holder is another cover 30. The cover is provided with a plurality of holes for application of bolts 26 by means of which it is secured to said holder. The cover contains an aperture 32 which is in register with the axial opening 22 in wheel 12, and another aperture 33 which is in register with axial opening 23 in the smaller wheel 14. The inner surface of said cover 30 contains a circular depression 34 which is axially alined with the circular space 11 for reception of the larger wheel. The depression is defined by a wall 35 which is disposed at right angle to said inner surface of cover 30. Again the diameter of the recess is such that the stub axles of the rollers between the sprockets of the smaller wheel will bear against said wall 35.

Fitting through the aperture 32 in cover 30 into the axial opening 22 in wheel 12, and keyed thereto, is a shaft 36. A similar shaft 37 fits through aperture 34 in the cover 30 into the axial opening 23 in the smaller wheel 14.

For the purpose of admission of a lubricating medium into the recesses 28 and 34, respectively, a radial duct 38 in a holder 10 is provided for the larger recess 34, and a similar duct 39 is provided for the smaller recess 28, each duct being preferably in the plane of the respective recess. Threaded closures for the duct are marked 40. I wish to state here that the location and the form of the ducts is but suggestive, and that any other means for admission of the lubricating medium may be well provided for the moving parts of the assembly, according to the best present practice.

The manner of the operation of the wheels is quite obvious. Power from the driving wheel is transmitted to a driven wheel by means of the rollers, which, carried by one wheel, will bear against the sprockets of the driven wheel and will impart to it a rotary movement about its axis. In the course of the operation, the circular depressions in the opposed side covers will serve as guiding races or tracks for the rollers, the stub axles of which project into the marginal portion of the respective recess and bear against the wall thereof.

The assembly of such wheels contained in a casing, may be mounted as a unit in the framework of a machine which may need a driving gear wheel and driven gear wheels, while the shafts axially fitted into the respective wheels would be operatively connected to other elements of the machine. While ordinarily shafts carrying gear wheels require special bearings, no such bearing would be necessary for any shaft at the end which fits into a roller gear in said assembly. As the roller wheel rides on its rollers, the wheel actually forms a roller bearing for the shaft.

After having described my improvement, what I wish to claim is as follows:

1. A gear wheel assembly including two wheels, the assembly comprising a flat holder having two circular spaces therein, a wheel disposed in each of the spaces, each wheel having in its peripheral portion a plurality of semi-circular recesses separated from each other by integrally-formed sprockets, a roller disposed in every second recess, each roller having at one end a stub axle, a cover secured to one side of the holder, the cover having in its inner surface a circular track for stub axles held in the recesses of one wheel, a similar cover secured to the other side of the holder and having in its inner surface a circular track for the stub axles of the rollers disposed in the recesses of the other wheel, one of said covers being provided with two apertures one of which is in register with the axial portion of one wheel while the other aperture is in register with the axial portion of the other wheel, a shaft extending from the axial portion of each wheel through the respective aperture in said cover, the rollers in one wheel being adapted to engage the semi-circular recesses in the other wheel and to impart a rotary movement to the other wheel.

2. A gear wheel assembly including a plate having two openings therein each defining a circle, the circles intersecting each other along their peripheral portions, a wheel disposed in each opening, each wheel having a plurality of semi-circular recesses in the peripheral portion thereof, a roller in every second recess, the rollers of one wheel being adapted to engage the roller-free recesses of the other wheel, each of the rollers having at one end a stub axle, the rollers in one wheel having the stub axles extending in one direction, the rollers in the other wheel having stub axles extending in the opposite direction, two side covers secured to the holder from opposite sides, one cover having a circular track in axial alinement with one wheel for guidance of the stub axles of the rollers in said wheel, the other cover having a circular track in axial alinement with the other wheel for the guidance of the stub axles of the rollers held therein, one of the covers having two apertures, each being in register with the axial portion of a respective wheel, a shaft axially secured to one wheel, and a similar shaft secured axially to the other wheel, the shafts extending from the wheel through said apertures in the last-named cover.

3. A roller wheel assembly comprising a flat holder having a plurality of circular spaces, a wheel in each space, the wheels being adapted to engage each other for rotation in the same plane, each wheel having in its periphery a plurality of arcuate recesses spaced from each other, a cylindrical roller in every second recess, the rollers in one wheel fitting into the roller-free recesses of the other wheel, each roller having at one end a stub axle, the stub axles of the rollers in one wheel projecting outwardly in the opposite direction to the stub axles of the rollers in an adjoining wheel, side cover means secured to the holder from the opposite sides, one cover having circular track means for guidance of the stub axles extending in the direction of said cover, the other cover having circular track means for guidance of the stub axles extending in the direction of the last-named cover, the cover means being provided with apertures in register with the axial portion of each wheel, and a shaft extending from the axial portion of each wheel outwardly through the respective apertures.

4. An assembly as defined in claim 3 but provided with duct means leading to the wheels from outside for admission of a lubricating medium.

No references cited.